United States Patent
Athey et al.

[11] 3,711,936
[45] Jan. 23, 1973

[54] METHOD FOR FORMING COMPOSITE ARTICLES FROM ALLOY IN TEMPORARY CONDITION OF SUPERPLASTICITY

[75] Inventors: Roy L. Athey, North Palm Beach; Joseph B. Moore, Jupiter Tequesta, both of Fla.

[73] Assignee: United Aircraft Corporation, East Hartford, Conn.

[22] Filed: Dec. 28, 1970

[21] Appl. No.: 101,742

[52] U.S. Cl. ............... 29/475, 29/156.8, 29/163.5, 29/472.3, 29/487, 29/498
[51] Int. Cl. ............................................ B23k 31/02
[58] Field of Search......29/156.8 H, 163.5, 475, 498, 29/487, 472.3, 471.1, 504

[56] References Cited

UNITED STATES PATENTS

| | | | |
|---|---|---|---|
| 2,266,349 | 12/1941 | Wempe | 29/604 UX |
| 2,732,323 | 1/1956 | Luivert | 29/487 X |
| 3,371,407 | 3/1968 | Forsyth et al. | 29/475 |
| 3,406,446 | 10/1968 | Muldovan | 29/498 X |
| 3,419,952 | 1/1969 | Carlson | 29/498 X |
| 3,443,301 | 5/1969 | Rasche et al. | 29/475 X |
| 3,444,608 | 5/1969 | Conn, Jr. et al. | 29/475 X |
| 3,601,884 | 8/1971 | Kemery | 29/498 X |
| 3,526,953 | 9/1970 | Levinstein | 29/472.3 X |
| 3,551,996 | 1/1971 | Summer et al. | 29/472.3 |

FOREIGN PATENTS OR APPLICATIONS

| | | | |
|---|---|---|---|
| 119,347 | 5/1958 | U.S.S.R. | 29/475 |

OTHER PUBLICATIONS

Hayden, H. W., et al., "Superplastic Metals", Scientific American, Mar. 1969, pp. 28-35. Class 72 Unofficial digest–superplasticity.

Underwood, Ervin E. "A Review of Superplasticity," Journal of Metals, Dec., 1962, pp. 914–919. 72 digest–superplasticity.

*Primary Examiner*—J. Spencer Overholser
*Assistant Examiner*—Ronald J. Shore
*Attorney*—Richard N. James

[57] ABSTRACT

Articles, including such gas turbine engine hardware as airfoils and discs, are formed by forging alloys in a temporary condition of low strength and high ductility around suitable supporting materials or shapes, and forming a composite by diffusion bonding. The supporting materials may be retained within the finished article to provide, for example, a filament strengthened composite or may subsequently be leached therefrom to form hollow hardware.

4 Claims, 3 Drawing Figures

PATENTED JAN 23 1973 3,711,936

INVENTOR
ROY L. ATHEY
JOSEPH B. MOORE

METHOD FOR FORMING COMPOSITE ARTICLES FROM ALLOY IN TEMPORARY CONDITION OF SUPERPLASTICITY

BACKGROUND OF THE INVENTION

The present invention relates to the production of composite articles utilizing combined forging and diffusion bonding techniques and it has particular applicability to the production of filament strengthened or hollow gas turbine engine hardware.

It has always been desirable and, more recently, it has become essential from a standpoint of economy, efficiency and performance to increase the operating parameters of the gas turbine engine. For the most part, however, the engine designer has in fact been limited in his designs by the physical properties of the materials available to him. In the more advanced engine designs, resort has recently been made to the use of filament strengthened blades and vanes, and hardware with internal cooling passages. While these expediencies have permitted improved performance of the advanced turbine engines, the inherent increased complexity of such parts has generated substantial problems for the fabricator.

In the manufacture of filament-strengthened hardware, a number of techniques are available to the fabricator. Most conventionally, the filaments are laid up in a mold in the desired pattern or orientation and a suitable matrix material is cast, or pressed and sintered around the filaments to form the composite. Unfortunately, however, the high pressures and temperatures associated with these techniques have tended to result in filament breakage or filament-matrix interactions, with the result that the fabricated composites have not in general achieved the high strengths expected of them, at least not with uniform consistency.

The production of thin-wall hollow hardware typically involves investment casting techniques wherein the alloys involved are cast around leachable cores of suitable shape which are subsequently leached from the casting. It has been suggested that the fabrication of such hollow parts can be greatly simplified if the parts are formed by assembly of several different subcomponents with the joining of such subcomponents into the desired hardware being accomplished by suitable means such as diffusion bonding.

The machining problems associated with manufacture of the respective subcomponents would normally be much less demanding than those associated with attempts to machine the entire assembled part in one piece. And this is particularly true in the case of hollow hardware if the requirement for machining internal passages of relatively complex configuration can be eliminated.

Diffusion bonding is well known in the art, as evidenced for example by the U.S. Pat. to Keeleric, No. 3,327,382. It involves the joining of metals usually below their melting point and is often selected as the joining technique, in preference to fusion welding or brazing methods, because of excellent reproducibility and, more importantly, because of greater material homogeneity across the joint. In fact, in properly made diffusion bonds, the joint interface is practically indistinguishable from the substrate even on microscopic metallurgical examination. Conventional diffusion bonding processes, however, typically require the use of high temperatures and pressures for the attainment of such satisfactory bonding. Unfortunately, under such bonding conditions, components which are designed for high rates of heat transfer, and accordingly, incorporate thin wall or web sections, are particularly subject to deformation or breakage.

In the patent to Moore et al. U.S. Pat. No. 3,519,503, which has both common inventors and a common assignee with the present invention, there is described a forging process wherein certain alloys, including those high strength alloys suitable for gas turbine engine applications, may readily be forged to very complex configurations in light presses at very low pressures. The above process is dependent upon the proper processing of the alloy to be forged to establish and maintain a temporary condition of low strength and high ductility in the material during the process. Recently, the literature has referred to the ability of materials to undergo abnormally large elongations without rupture as superplasticity, although it should be observed that the above patent and the present process do not contemplate the use of materials generally considered to be superplastic per se. Such a material condition would, of course, be inimical to the properties expected of a gas turbine engine component or articles of similar nature and thus the condition must be one of temporary nature.

SUMMARY OF THE INVENTION

The present invention relates to the formation of composite articles from alloys, while in a temporary condition of low strength and high ductility, are forged around suitable supporting materials and diffusion bonded. The supporting materials are subsequently either retained in the composite article for reinforcement or other purposes, or are selectively leached thereon to provide internal passages or cores.

DESCRIPTION OF THE PREFERRED EMBODIMENTS

A titanium alloy of the nominal composition, by weight, 6 percent aluminum, 4 percent molybdenum, balance titanium was worked in compression by rolling at 1700°F. to the following conditions, as established by tensile tests:

| Sample | Flow Stress | % Elong. | % R.A. | Strain Rate |
|---|---|---|---|---|
| 1 | 9430 psi | 99 | 97.8 | 0.50 in/in/min |
| 2 | 5440 | 164 | 99.5 | 0.15 |
| 3 | 4900 | 169 | 99.5 | 0.05 |
| 4 | 1405 | 400 | 99.2 | 0.02 |

Figure 1:
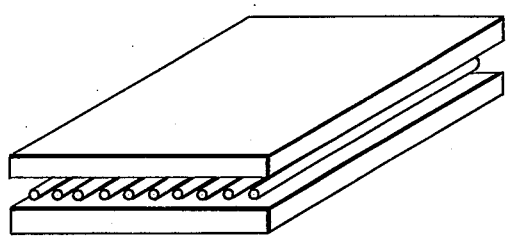
FIG. 1 schematically illustrates a plurality of wires in juxtaposition between two sheets of an alloy.
Figure 2:
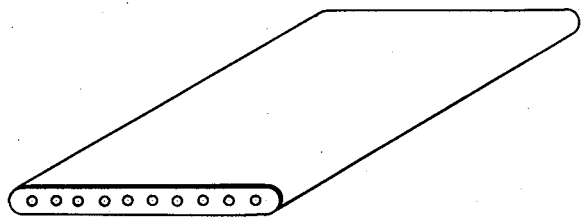
FIG. 2 shows the condition of the composite formed by forging the alloy sheets around the wires and diffusion bonding the sheets together.
Figure 3:
FIG. 3 is a photomicrograph of a composite formed from a titanium alloy forged and diffusion bonded around stainless steel wires illustrating the homogeneity of the diffusion bonded joint. (1000 × before reduction)

Two pieces of the alloy, approximately 2 ½ inches in diameter and one-fourth inch thick were positioned on either side of a plurality of aligned 304 stainless steel wires as shown in FIG. 1. The forging around the wires to form the composite of FIGS. 2 and 3 was accomplished in a small laboratory press (2 − 3 tons) at 1700°F. in vacuum with enough pressure to forge the titanium around the wires. The pieces were unrestrained radially during forging and a finished composite of three-eighths inch thickness was produced.

Subsequent to the forming operation, the stainless steel wires were selectively leached from the composite by dissolution in warm 50 percent nitric acid.

Subsequent metallurgical analysis revealed that the alloy had flowed around the supporting wires and conformed thereto to provide a composite free of voids. In addition, the alloy had been completely diffusion bonded together at the interface between the titanium discs and the joint so formed was completely homogeneous and, in fact, practically indistinguishable from a parent metal. This may readily be seen from inspection of the photomicrograph of FIG. 3 wherein the joint line extends horizontally of the photomicrograph.

It is, of course, essential in this process, as in most diffusion bonding processes, to provide clean surfaces at the interface where the bonding is to take place. In particular, the joint interface during processing must be free of contaminating species which interfere with the bonding process or lead to heterogeneity at the joint area. In the case of titanium, bonding is typically undertaken in vacuum or under inert gas cover. However, the titanium oxides are soluble at the conditions of bonding described above and, therefore, unless the oxides are present in gross amounts they do not appear to provide undue interference with the desired joint formation.

On the other hand, the oxides of certain other elements such as those formed on the nickel-base alloys are not dissipated in the bonding sequence and may reform even on clean surfaces in interfering quantities under the vacuum or inert gas conditions typically utilized in these processes. Thus, it is frequently not sufficient with these alloys to provide an initially clean surface and depend on a protective atmosphere to maintain the same. Frequently, the use of a bond promoter is required, as suggested in the patents to Gemma U.S. Pat. No. 3,262,719 and LaPan et al. U.S. Pat. 3,349,465.

In connection with the advanced nickel-base superalloys of the $\gamma - \gamma'$ type, particularly those superalloys of high aluminum and titanium content, the use of a bond promoter such as a thin layer of nickel or a nickel/cobalt alloy is desirable to provide joint homogeneity as described in the patent to Owczarski et al., U.S. Pat. No. 3,530,568. As discussed in that patent, it was found that diffusion welds made between the rich nickel-base superalloys may contain a precipitation-laden planar zone at the joint area, which inherently results in poor mechanical properties. Furthermore, it was found that joints made below the $\gamma'$ solvus result in the production of a course $\gamma'$ layer at the joint with adjacent regions depleted in aluminum and titanium again to the detriment of mechanical properties. The use of a thin nickel plate or nickel/cobalt alloy at the joint interface permitted the production of joints which were practically indistinguishable microstructurally from the base metal.

Another requirement in the typical diffusion bonding processes is a close physical match between the surfaces to be joined, inasmuch as the diffusion bonding mechanism normally involves a solid state diffusion mechanism at the surfaces to be joined. This is one reason why relatively high pressures are usually advisable in diffusion bonding processes. It will be observed, however, that the surface match or flatness is not particularly critical in the present processing and that intimate contact is readily achieved at relatively low pressures. In fact, the present process contemplates the intentional provision of the supporting wires or materials between at least some of the surfaces to be diffusion bonded and, to this extent, is in contradiction to the usual diffusion bonding philosophy.

With reference to the composition and character of the supporting material, it is clearly necessary that it be compatible with the matrix material at the processing conditions. Furthermore, it should be relatively undeformable at these conditions or, at least, be predictably so, as compared to the matrix. Still further, when hollow hardware is contemplated the supporting material must be selectively removable from the matrix as, for example, by leaching. This would normally suggest that the basic alloy systems preferably differ as between the matrix alloy and the supporting material. This, however, is not necessarily a requirement when the supporting material is to be retained in the composite. It is perfectly feasible to provide the matrix alloy in the condition of low strength and high ductility and forge and diffusion bond it around an alloy of the same chemistry but provided in a high strength/high hardness condition.

Thus, it may be seen that matrix alloys are provided in a temporary condition of superplasticity and are forged or otherwise formed around a supporting material under conditions conductive to maintenance of both the condition of superplasticity and the formation of a diffusion bond, superplasticity referring simply to the ability of a material to undergo abnormally large deformations without rupture. A temporary condition of superplasticity therefore requires that the condition may be eliminated by subsequent processing of the matrix alloys, as by suitable heat treatment.

For the sake of clarity and brevity the invention has been described in connection with certain examples and preferred embodiments. However, it will be understood that the invention is not limited to the exact details described for obvious modifications will occur to those skilled in the art.

We claim:

1. The method of forming composite articles having a matrix consisting of a normally high strength, difficult-to-work, age-hardenable alloy which comprises:
   providing the matrix alloy in a temporary condition of superplasticity;
   providing a supporting material compatible with and more resistant to deformation than the matrix alloy in its temporary condition of superplasticity;
   sandwiching the supporting material in appropriate orientation between opposing faces of the matrix alloy;

pressing the matrix alloy around the supporting material while maintaining the condition of superplasticity;

and diffusion bonding the opposing faces of the matrix alloy together.

2. The method according to claim 1 wherein:
the composite is subsequently heat treated to harden the matrix material through a precipitation mechanism.

3. The method according to claim 1 wherein:
the supporting material is subsequently selectively leached from the matrix alloy.

4. The method according to claim 3 wherein:
the matrix alloy is heat treated to precipitate the hardening phases.

* * * * *